United States Patent [19]

Udagawa

[11] Patent Number: 4,778,189
[45] Date of Patent: Oct. 18, 1988

[54] GASKET WITH ELASTIC SEALING MEMBERS

[75] Inventor: Tsunekazu Udagawa, Ichikawa, Japan

[73] Assignee: Ishikawa Gasket Co., Ltd., Tokyo, Japan

[21] Appl. No.: 18,235

[22] Filed: Feb. 24, 1987

[30] Foreign Application Priority Data

Apr. 11, 1986 [JP] Japan .......................... 61-054526[U]

[51] Int. Cl.⁴ ............................................. F16J 15/10
[52] U.S. Cl. ........................... 277/207 R; 277/207 A; 277/215
[58] Field of Search ................ 277/167.5, 180, 207 R, 277/207 A, 207 B, 215

[56] References Cited

U.S. PATENT DOCUMENTS

| | | | |
|---|---|---|---|
| 138,633 | 5/1873 | Giffard | 277/207 |
| 480,643 | 8/1892 | Welsh | 277/207 |
| 854,234 | 5/1907 | Perry | 277/207 X |
| 1,883,609 | 10/1932 | Dennis | 277/207 X |
| 3,123,367 | 3/1964 | Brummer et al. | 277/207 X |
| 3,228,039 | 1/1966 | Freeman | 277/207 X |
| 4,140,323 | 2/1979 | Jacobs | 277/207 R X |
| 4,426,095 | 1/1984 | Buttner | 277/207 A |
| 4,565,381 | 1/1986 | Joelson | 277/207 A |

FOREIGN PATENT DOCUMENTS 1388894 3/1975 United Kingdom ............ 277/207 R

*Primary Examiner*—Robert S. Ward
*Attorney, Agent, or Firm*—Frank J. Jordan; C. Bruce Hamburg; Manabu Kanesaka

[57] ABSTRACT

A gasket comprises a main body having at least one opening and a plurality of elastic members provided on at least one of upper and lower surfaces of the main body. The elastic members slightly project outwardly from the upper or lower surface. The elastic members surround the openings so that when the gasket is compressed between two parts, the elastic member deform to thereby securely seal around the opening.

2 Claims, 1 Drawing Sheet

GASKET WITH ELASTIC SEALING MEMBERS

BACKGROUND OF THE INVENTION AND RELATED ART STATEMENT

The present invention relates to a gasket for sealing between two parts, more particularly the gasket especially designed to seal around a fluid passage.

When two parts having fluid passages therein are connected together, a gasket having an opening corresponding to the fluid passages is disposed between the two parts. Conventionally, the gasket is provided with a body having an opening, and a resilient layer mounted on the body around the opening thereof. When the gasket is positioned between the two parts and is tightened, the resilient layer receives sealing pressure to thereby seal between the two parts.

The conventional gasket is provided with one resilient layer on the body, which is formed on the body for 2–4 mm width and 50–100 micron thickness by a screen printing.

Since the conventional gasket includes only one resilient layer on the body, if the resilient layer receives heavy load, plastic deformation occurs on the resilient layer. If heavy load is applied repeatedly, the resilient layer is finally broken, so that the resilient layer can not provide adequate sealing pressure thereon.

Accordingly, one object of the present invention is to provide a gasket which can seal properly around a fluid passage.

Another object of the invention is to provide a gasket as stated above, which can seal efficiently for a long usage.

A further object of the invention is to provide a gasket as stated above, which can be easily and economically manufactured.

Further objects and advantages of the invention will be apparent from the following description of the invention.

SUMMARY OF THE INVENTION

In accordance with the present invention, a gasket comprises a main body having at least one opening to be sealed therearound, and a plurality of elastic members provided on at least one of upper and lower surfaces of the main body. The elastic members slightly project outwardly from the upper or lower surface. The elastic members surround the opening respectively so that when the gasket is compressed for sealing, the elastic members deform to thereby securely seal around the opening.

The elastic members are slightly spaced apart from each other to seal around the opening independently. Leakage of fluid passing through the opening is prevented by the elastic members. Generally, the elastic members may be provided on one side of the main body. However, the elastic members may be formed on two sides of the main body.

The cross sectional dimensions of all the elastic members may be the same. Alternatively, the cross sectional dimensions of one of the elastic members may be larger than those of the other elastic members. Preferably, the elastic member having the large cross sectional dimensions may be made softer than the others.

DETAILED DESCRIPTION OF PREFERRED EMBODIMENTS

Figure 1:
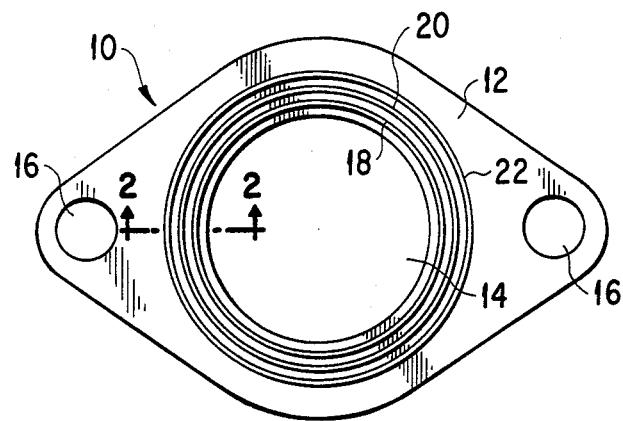
FIG. 1 is a plan view of a first embodiment of a gasket of the invention.
Figure 2:
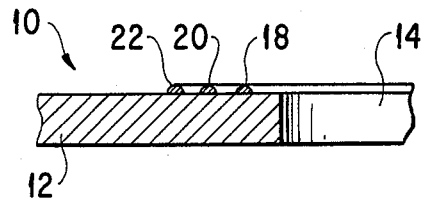
FIG. 2 is an enlarged cross section view taken along lines 2—2 in FIG. 1.

Referring to FIGS. 1 and 2, one embodiment 10 of a gasket of the invention is shown, wherein a technical idea of the invention is applied to a flange gasket.

The gasket 10 comprises a main body 12 having a fluid passage 14 and two bolt holes 16, and three elastic members 18, 20, 22 formed on the main body 12 to surround the passage 14. The three elastic members 18, 20, 22 are arranged close to each other and concentrically relative to the passage 14.

The elastic members 18, 20, 22 are made of silicone rubber. However, the elastic members may be made of silicone resin, epoxy resin or fluorine-contained polymers. The elastic members may be made of any kind of materials if they have elasticity. If the gasket is used for a member where high temperature is applied, such as a head gasket, the elastic member must have an anti-heat property as well.

The elastic members are concentrically arranged on the main body 12, but the elastic members need not be arranged concentrically. Also, three elastic members are formed on the main body 12, but two elastic members may be sufficient. Further, the elastic members need not be the same shape.

In the gasket 10, the main body 12 is composed of a single plate, but the main body may be a steel laminate gasket or an asbestos gasket. Further, the elastic members may be formed on both sides of the main body.

When the gasket 10 is situated between two members and is tightened, the three elastic members receive sealing pressure equally. Therefore, even if high pressure is repeatedly applied thereto, the sealing ability of the elastic members does not change. Further, the three elastic members cooperate together and prevent leakage of the gasket.

Figure 3:
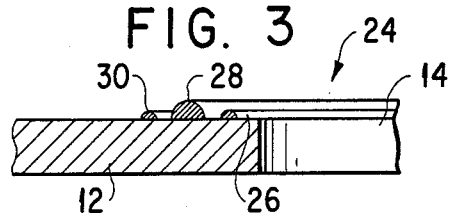
FIG. 3 is a cross section view similar to FIG. 2 showing a second embodiment of a gasket of the invention.

FIG. 3 shows a second embodiment 24 of a gasket of the invention. The gasket 24 comprises the main body 12 and three elastic members 26, 28, 30. The central elastic member 28 is made larger in cross section and softer than the other elastic members 26, 30.

In use, when the gasket 24 is situated between two members and is tightened, at first the central elastic member 28 deforms. The deformation of the elastic member 28 toward the elastic members 26, 30 is prevented by the respective elastic members 26, 30. Namely, the elastic members 26, 30 operate to support the elastic member 28. As a result, sealing pressure applied to the elastic member 28 can be effectively retained. Since the elastic member 28 is made of a soft material, even if high pressure is repeatedly applied to the gasket, the sealing ability of the elastic member 28 does not change.

In the past, the sealing pressure on a gasket is applied to a relatively thick single resilient layer, so that the sealing pressure is concentrated at the resilient layer. Therefore, the resilient layer may be broken by a long usage.

However, in the present invention, a plurality of elastic members are formed on the main body. Although the total sealing dimensions of the elastic members of the invention is substantially the same as those of the resilient layer in the conventional gasket, the sealing pressure is not concentrated in one area and is spread to all the elastic members. Therefore, break of the elastic members is effectively prevented.

While the invention has been explained with reference to the specific embodiments of the invention, the explanation is illustrative and the invention is limited only by the appended claims.

I claim:

1. A gasket for sealing between two parts, comprising:

a main body having at least one opening to be sealed therearound and upper and lower surfaces, and a plurality of elastic members provided on at least one of the upper and lower surfaces to project outwardly therefrom, said elastic members being spaced apart from each other and independently surrounding the opening so that when the gasket is compressed for sealing between the two parts, the elastic members deform to thereby securely seal around the opening, cross sectional dimensions of the respective elastic members taken along the radial direction of the opening being different, and the elastic member having the large cross sectional dimensions being softer than the others.

2. A gasket according to claim 1, wherein at least three elastic members are formed on the main body, the middle elastic member having the large cross sectional dimensions.

* * * * *